US012366986B2

(12) United States Patent
Li et al.

(10) Patent No.: US 12,366,986 B2
(45) Date of Patent: Jul. 22, 2025

(54) ON-SSD-COPY TECHNIQUES USING COPY-ON-WRITE

(71) Applicant: SK hynix NAND Product Solutions Corp., San Jose, CA (US)

(72) Inventors: Peng Li, Beaverton, OR (US); Sanjeev N. Trika, Portland, OR (US); David C. Estrada, Portland, OR (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 768 days.

(21) Appl. No.: 17/203,174

(22) Filed: Mar. 16, 2021

(65) Prior Publication Data

US 2021/0223979 A1    Jul. 22, 2021

(51) Int. Cl.
*G06F 3/06* (2006.01)
(52) U.S. Cl.
CPC .......... *G06F 3/0647* (2013.01); *G06F 3/0604* (2013.01); *G06F 3/0679* (2013.01)
(58) Field of Classification Search
CPC .... G06F 3/0647; G06F 3/0604; G06F 3/0679; G06F 3/064; G06F 3/061
See application file for complete search history.

(56) References Cited

U.S. PATENT DOCUMENTS

| | | | |
|---|---|---|---|
| 2010/0153620 A1 | 6/2010 | Mckean et al. | |
| 2013/0219106 A1* | 8/2013 | Vogan | G06F 12/0246 711/E12.008 |
| 2014/0089264 A1 | 3/2014 | Talagala et al. | |
| 2014/0101369 A1 | 4/2014 | Tomlin et al. | |
| 2016/0203053 A1 | 7/2016 | Talagala et al. | |
| 2017/0177243 A1* | 6/2017 | Trika | G06F 11/2094 |
| 2018/0217757 A1* | 8/2018 | Bansode | G06F 3/0665 |
| 2019/0012109 A1* | 1/2019 | Byun | G06F 3/0679 |

(Continued)

FOREIGN PATENT DOCUMENTS

| KR | 10-2016-0103945 | 9/2016 |
|---|---|---|
| KR | 10-2019-0060528 | 6/2019 |

OTHER PUBLICATIONS

Extended European Search Report dated Dec. 11, 2024 in EP Patent Application No. 22772149.5, pp. 1-11.

(Continued)

*Primary Examiner* — Nanci N Wong
(74) *Attorney, Agent, or Firm* — Byrne Poh LLP

(57) ABSTRACT

On-SSD-copy using Copy-On-Write (COW) techniques track indirection updates to the copied data without duplicating the data. In one example, a method involves receiving a copy command to copy data from a source LBA to a destination LBA. An entry in a logical-to-physical (L2P) table corresponding to the destination LBA is updated to refer to the same physical address as the source LBA's entry in the L2P table. Flags in the L2P table are updated to indicate that more than one LBA refers to the same physical address. After updating the L2P table and before copying the data, a token is stored to the storage device. After storing the token, but before copying the data, an acknowledgement can be sent to the host to indicate the copy command is complete. A subsequent write to either the source or destination LBAs trigger a copy of the data.

20 Claims, 9 Drawing Sheets

(56) References Cited

U.S. PATENT DOCUMENTS

| | | | |
|---|---|---|---|
| 2019/0146913 A1* | 5/2019 | Trika | G06F 12/0246 |
| | | | 711/103 |
| 2020/0218655 A1 | 7/2020 | Kanno | |
| 2020/0250099 A1* | 8/2020 | Campbell | G06F 12/145 |
| 2021/0223979 A1 | 7/2021 | Li et al. | |

OTHER PUBLICATIONS

International Preliminary Report on Patentability dated Sep. 28, 2023 in International Application No. PCT/2022/020595, pp. 1-6.
International Search Report and Written Opinion dated Jun. 30, 2022 in International Patent Application No. PCT/US2022/020595, pp. 1-10.

* cited by examiner

| L2P TABLE 151 | | |
|---|---|---|
| LBA | PBA | Reference Flag |
| A | X | 1 |
| B | X | 1 |
| C | Y | 0 |
| ⋮ | ⋮ | ⋮ |

FIG. 3A

| SUBSET P2L TABLE 153 | |
|---|---|
| PBA | LBA |
| X | A |
| X | B |
| ⋮ | ⋮ |

FIG. 3B

Pseudocode of L2P Table Entry 500

```
502        typedef struct
504        {
506            uint32_t NAND_Address : 31;
508            uint32_t Reference_Flag : 1;

510        } L2P_Entry;

512        L2P_Entry L2P[NUM_OF_ENTRIES];
```

FIG. 5

Pseudocode of an on-SSD-copy command 600

```
602        void copy(uint32_t src, uint32_t dest, uint32_t num)
           {
606            trim(dest, num);
608            for (uint32_t k = 0; k < num; k++)
610            {
612                L2P[dest + k].NAND_Address = L2P[src + k].NAND_Address;
614                L2P[dest + k].Reference_Flag = 1;
616                L2P[src + k].Reference_Flag = 1;
618            }

// Update the P2L table.
620            p2l.insert(src, num);
622            p2l.insert(dest, num);

624            dropCopyCmdToken(src, dest, num, &ackHostCompletion);
           }
```

FIG. 6

Trim command 700

```
702     void trim(uint32_t src, uint32_t num)
        {
706         for (uint32_t k = 0; k < num; k++)
708         {
710             if (L2P[src + k].Reference_Flag == 1)
712             {
714                 p2l.remove(L2P[src + k].NAND_Address, src + k);
716             }
718             L2P[src + k].NAND_Address = 0;
720             L2P[src + k].Reference_Flag = 0;
722         }
724         dropTrimCmdToken(src, num, &ackHostCompletion);
        }
```

FIG. 7

Write command 800

```
802     void write(uint32_t src, uint32_t num)
        {
806         for (uint32_t k = 0; k < num; k++)
808         {
810             if (L2P[src + k].Reference_Flag == 1)
812             {
814                 L2P[src + k].Reference_Flag = 0;
816                 p2l.remove(L2P[src + k].NAND_Address, src + k);
                }
820             L2P[src + k].NAND_Address = allocateNandPage();
            }
824         setupDma(src, num);
        }
```

FIG. 8

Defrag command 1000

```
1002      void defrag(uint32_t src, uint32_t dest)
          {
1006          loadBandJournal(src, &bandJournal);
1008          for (uint32_t k = 0; k < NUM_PAGES_PER_BAND; k++)
              {
1012              curNandAddress = getNandPageAddress(src, k);
1014              newNandAddress = getCurrentNandPage(dest);

1016              if (p2l.lookup(curNandAddress))
                  {
1020                  p2l.replace(curNandAddress, newNandAddress);
1022                  relocate(curNandAddress, newNandAddress);
                  }
1026              else
                  {
1030                  l2pEntry = bandJournal[k];
1032                  if (isValid(l2pEntry, curNandAddress))
                      {
1036                      L2P[l2pEntry].NAND_Address = newNandAddress;
1038                      relocate(curNandAddress, newNandAddress);
                      }
                  }
              }
          }
```

FIG. 10

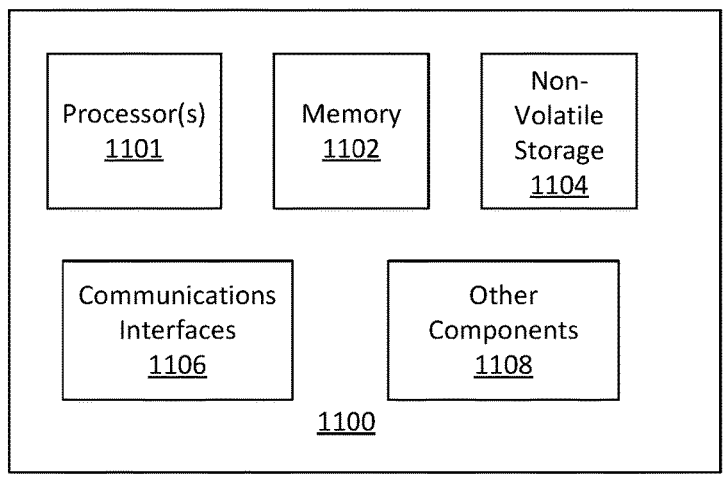

FIG. 11

ON-SSD-COPY TECHNIQUES USING COPY-ON-WRITE

FIELD

The descriptions are generally related to non-volatile storage media such as NAND flash memory, and specifically to on-SSD copy techniques.

BACKGROUND

Data copy operations on storage devices, such as solid state drives, hard disk drives, and memory devices, are common operations in computer systems. Data copy operations may be user- or system-initiated and are used to copy data from a source location to a destination location. Excessive use of data copy operations can impact performance in computer system because when a host waits for the data copy operation to complete before performing a subsequent task.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" or "examples" are to be understood as describing a particular feature, structure, and/or characteristic included in at least one implementation of the invention. Thus, phrases such as "in one embodiment" or "in one example" appearing herein describe various embodiments and implementations of the invention, and do not necessarily all refer to the same embodiment. However, they are also not necessarily mutually exclusive.

FIG. 3A illustrates an example of a logical-to-physical (L2P) table for an NVM device capable of performing on-SSD copy-on-write operations.

FIG. 3B illustrates an example of a subset physical-to-logical (P2L) table for an NVM device capable of performing on-SSD copy-on-write operations.

FIGS. 5-8 are examples of pseudocode to perform functions for an on-SSD-copy command.

FIG. 10 is an example of pseudocode for a defrag operation.

FIG. 11 provides an exemplary depiction of a computing system in which data copy techniques can be implemented.

Descriptions of certain details and implementations follow, including a description of the figures, which may depict some or all of the embodiments described below, as well as discussing other potential embodiments or implementations of the inventive concepts presented herein.

DETAILED DESCRIPTION

On-SSD-Copy techniques using copy-on-write can enable improved copy performance, media endurance, logical/physical capacity, power consumption, and internal read/write bandwidth.

Data copy operations are common in real-world applications. "On-SSD-Copy" is a technique that copies data inside the SSD (solid state drive) without moving data to the host memory. On-SSD-Copy can improve the host performance significantly for copy commands that have a large data payload.

However, on-SSD-copy operations may consume significant media endurance, power, and internal read/write bandwidth. Additionally, conventional on-SSD-copy operations do not save physical and logical capacity of the SSD.

In contrast, on-SSD-copy using Copy-On-Write (COW) techniques track indirection updates to the copied data without duplicating the data; thus, on-SSD-copy using copy-on-write may significantly increases copy performance, save media endurance and logical/physical capacity, reduce power consumption, and improve internal read/write bandwidth.

In one example, a method of performing an on-SSD copy involves receiving, at a non-volatile storage device, a copy command from a host to copy data from a source logical block address (LBA) to a destination logical block address (LBA). An entry in a logical-to-physical (L2P) table corresponding to the destination LBA is updated to refer to the same physical address as the source LBA's entry in the L2P table. Flags in the L2P table are updated to indicate that more than one LBA refers to the same physical address. After updating the L2P table and before copying the data, a token is stored to the non-volatile storage device to indicate the copy command is complete. After storing the token, but before copying the data, an acknowledgement can be sent to the host to indicate the copy command is complete. A subsequent write to either the source or destination LBAs triggers a copy of the data.

Figure 1:
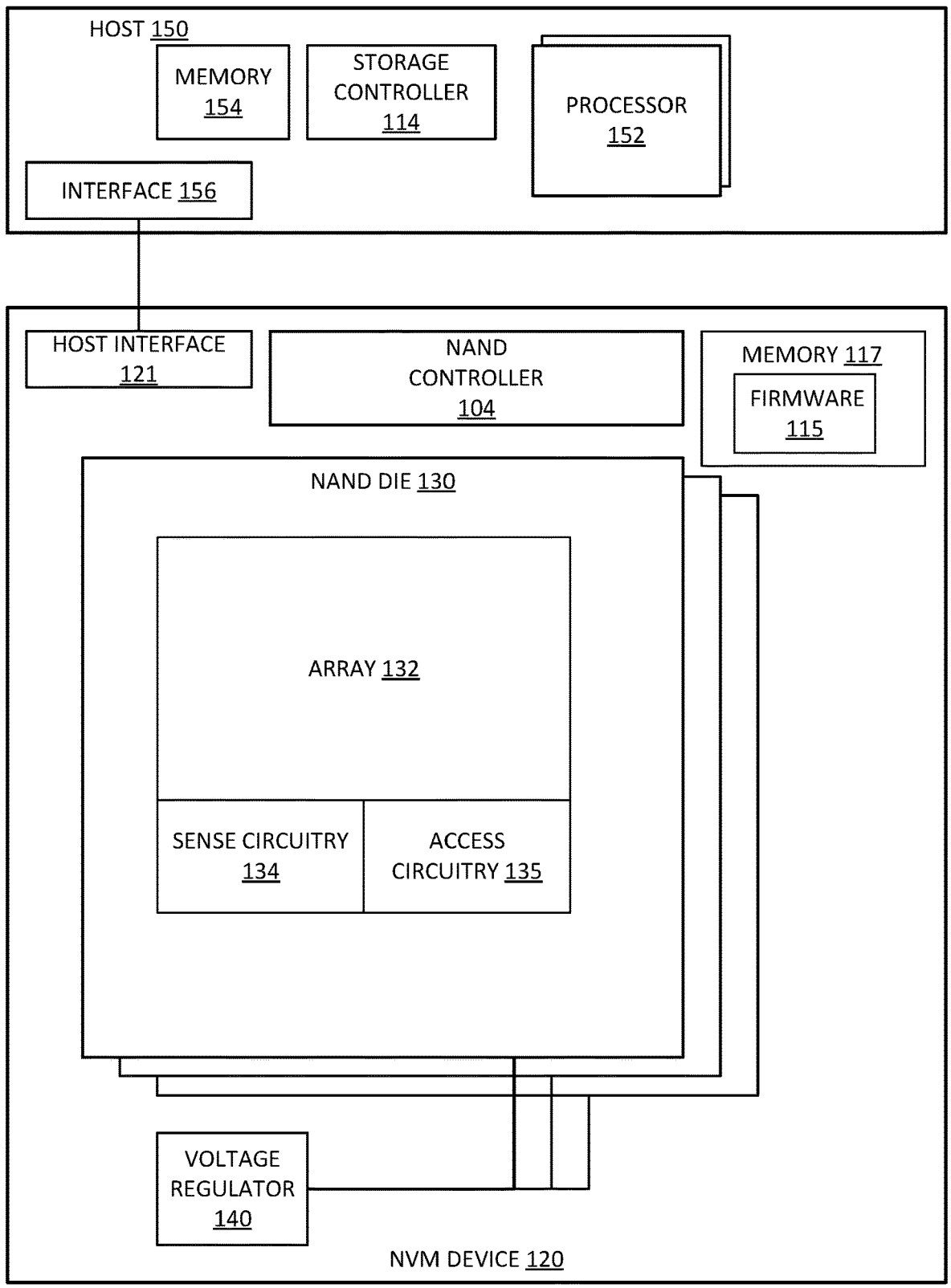
FIG. 1 is a block diagram of an example system that includes a non-volatile memory (NVM) device.

FIG. 1 is a block diagram of an example system that includes a non-volatile memory (NVM) or storage device. The system 100 is an example of a system that may implement on-SSD copy techniques described herein.

The system 100 includes a host 150 and non-volatile storage or non-volatile memory (NVM) device 120. The NVM device 120 may be a solid state drive (SSD) or other non-volatile memory device or drive. The host 150 and the NVM device 120 can be an example of a system that exists within the confines of a computer's package (e.g., within a laptop/notebook, server, or other computer). In other examples, the NVM 120 may be accessed via a larger network such as a local area network (e.g., an Ethernet network), or a wide area network (such as a wireless cellular network, the Internet, etc.). Such examples may be in compliance with a standard such as NVMe-oF (non-volatile memory express over fabrics). The host 150 includes one or more processors 152, memory 154, a storage controller 114, and other components that are omitted from the drawing for clarity.

The NVM device 120 includes one or more memory arrays 132 for storing data. The arrays 132 can be a memory or storage medium that can store one or more bits in memory cells. In one example, the arrays include strings of memory cells such as the NAND string illustrated in FIG. 2, discussed below. In one example, the NVM device 120 includes one or more non-volatile memory dies, each divided into multiple planes or groups. NAND flash memory is typically block-addressable. Typical NAND dies have multiple planes per die. A plane includes multiple memory cells which may be grouped into blocks. A block is typically the smallest erasable entity in a NAND flash die. In one example, a block includes a number of cells that are coupled to the same bitline. A block includes one or multiple pages of cells. The size of the page can vary depending on implementation. In one example, a page has a size of 16 kB. Page sizes of less or more than 16 kB are also possible (e.g., 512B, 2 kB, 4 kB, etc.). In one example, the NVM device 120 can include memory devices that use multi-threshold level NAND flash memory. The array 132 can include single-level cell (SLC) NAND storage devices, multi-level cell (MLC) NAND storage devices, triple-level cell (TLC) NAND storage devices, quad-level cell (QLC) storage devices, penta-Level Cell (PLC), and/or some other NAND.

The NVM device 120 communicates with the host system 150 using respective interfaces 121 and 156. In one example, the interface 156 is a part of a peripheral control hub (PCH). In the example illustrated in FIG. 1, the host includes a controller 114 that is coupled with the NVM device 120 via the interface 156 to communicate with and control the NVM device 120. In the illustrated example, the NVM device 120 includes a controller 104 that is coupled with a computing platform such as the host 150 via the interface 121. In one example, the controller 104 is an ASIC (application specific integrated circuit). In one example, the interfaces are compliant with a standard such as PCI Express (PCIe), serial advanced technology attachment (ATA), a parallel ATA, universal serial bus (USB), and/or other interface protocol. The controller 104 can communicate with elements of the computing platform to read data from the NAND dies 130 or write data to the NAND dies 130. Although in this disclosure, the term "host" is referring to a system with a processor (or other device sending requests to access data stored in a non-volatile memory) and an interface for communicating with the NAND (e.g., the host 150), some implementations may refer to the controller 104 as a "host" relative to the NAND dies 130.

The controller 104 can be configured to receive requests from the host 150 and generate and perform commands concerning the access of the arrays 132 (e.g., to read data, write, or erase data). Other commands may include, for example, commands to read status, commands to change configuration settings, a reset command, etc. The controller includes control logic that can be implemented with hardware (e.g., circuitry), software, firmware, or a combination of hardware, software and firmware. Examples of logic circuitry include dedicated hardwired logic circuitry (including, e.g., one or more state machine logic circuits), programmable logic circuitry (e.g., field programmable gate array (FPGA), and a programmable logic array (PLA). In one example, logic circuitry is designed to execute some form of program code such as SSD firmware (e.g., an embedded processor, embedded controller, etc.).

The NVM device 120 may include a memory 117 coupled with the controller 104 which can be used to cache data from the non-volatile media and store firmware 115 executed by the controller 104. In one example, the memory 117 is volatile memory. Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

The controller 104 is coupled with the NAND dies 130 to control or command circuitry on the dies to cause operations to occur (e.g., read, program, erase, suspend, resume, and other operations). Communication between the NAND dies 130 and the controller 104 may include the writing to and/or reading from specific registers. Such registers may reside in the controller 104, on the NAND dies 130, or external to the controller 104 and the NAND dies 130. Registers or memory within the dies 130 may be reachable by the controller 104 by, e.g., an internal interface between the controller 104 and NAND dies 130 (e.g., an Open NAND Flash Interface (ONFI) interface, a proprietary interface, or other interface) to communicatively couple the controller 104 and the arrays 132. Input/output (I/O) pins and signal lines communicatively couple the controller 104 with the NAND dies 130 to enable the transmission of read and write data between the controller 104 and the NAND dies 130. The I/O pins may also be used to transmit other data, such as status information of the dies or planes of the NAND dies 130. The NAND dies can also include other pins such as command pins (e.g., command latch enable (CLE), address latch enable (ALE), chip enable (CE #), read enable (RE #), and write enable (WE #)), and power and ground pins (e.g., Vcc, Vss, etc.). The voltage regulator 140 represents circuitry to provide one or more voltages to the access circuitry 135, sense circuitry 134, and/or array 132.

The NAND die 130 includes access circuitry 135 to control access to the array 132. For example, the access circuitry 135 is to generate or apply voltages to the array 132 to perform access operations (e.g., read operations, program operations, etc.) based on commands received from the controller 104. The access circuitry on the NAND die 130 is coupled to word lines of array 132 to select one of the word lines, apply read voltages, apply program voltages combined with bit line potential levels, apply verify voltages, or apply erase voltages. The sense circuitry 134 and access circuitry 135 are coupled to bit lines of array 132 to read data stored in the memory cells, determine a state of the memory cells during a program operation, and control potential levels of the bit lines to promote or inhibit programming and erasing.

Although the example in FIG. 1 refers to a NAND device, other non-volatile memory devices may implement the on-SSD copy techniques described herein. Furthermore, although the technique is referred to as "on-SSD" copy for ease of reference, the techniques described herein may be implemented on NVM devices other than SSDs (e.g., memory modules such as dual-in-line DIMMs with non-volatile memory, or other NVM devices).

Figure 2:
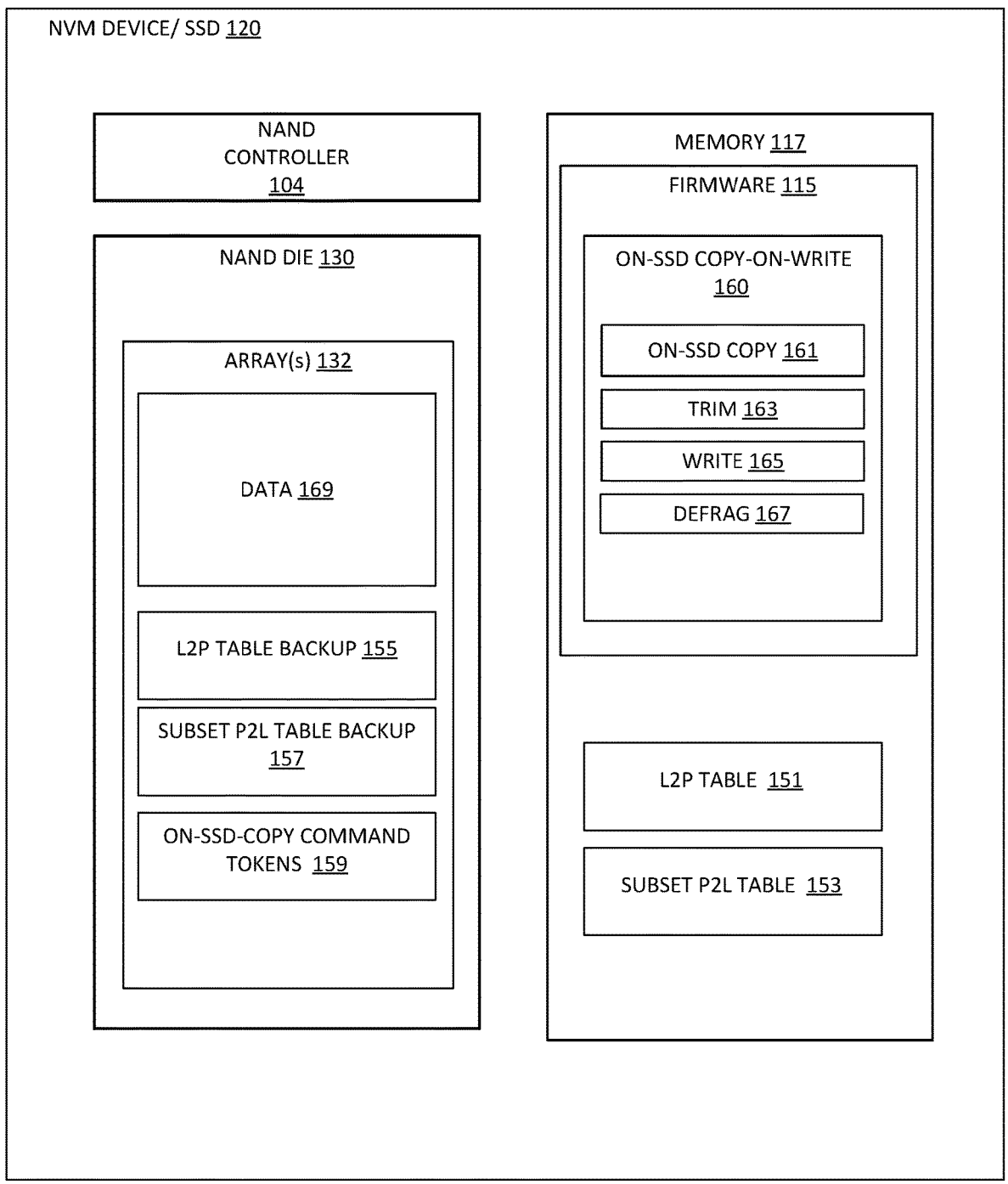
FIG. 2 is a block diagram an example of an NVM device.

FIG. 2 is a block diagram of the NVM device 120 of FIG. 1. As mentioned above with respect to FIG. 1, a NAND controller 104 executes firmware 115 stored in memory 117 to communicate with and control the NAND dies 130. In one example, the on-SSD copy-on-write 160 techniques are implemented in the firmware 115. In the example illustrated in FIG. 2, the firmware for performing on-SSD copy-on-write includes an on-SSD copy function 161, a trim function 163, a write function 165, and a defrag function 167. The firmware for implementing on-SSD copy-on-write refer to an modify a logical-to-physical (L2P) table 151 and a physical-to-logical (P2L) table 153, also stored in memory 117. Although the tables 151 and 153 are shown as being stored in the same memory as the firmware 115, the NVM device 120 may include more than one memory or storage device for storing firmware and mapping tables. The NAND media (e.g., arrays 132) store data 169. The NAND media may also store backups 155, 157 of the L2P and P2L tables stored in memory. In performing the on-SSD copy-on-write operations, the firmware 115 stores tokens 159 in the NAND media to indicate when an on-SSD copy command has completed.

FIG. 3A illustrates an example of a logical-to-physical (L2P) table for an NVM device capable of performing on-SSD copy-on-write operations. The L2P table 151 is a mapping table that maps logical block addresses (LBAs) to physical block addresses (PBAs, physical addresses, or NAND addresses). Unlike conventional L2P tables, the L2P table 151 includes an additional reference flag corresponding to each entry or LBA. The reference flag includes one or more bits to indicate whether the physical address pointed to by the LBA is referred to by more than one LBA. In the illustrated example, the reference flag includes one bit per entry that indicates if the NAND address is referred to by multiple L2P entries. In the example illustrated in FIG. 3A, the LBAs A and B point to the same NAND address X. Therefore, the reference flag is set for the L2P entries corresponding to both LBA A and LBA B is set to a value to indicate that more than one LBA refers to the physical address.

In the example illustrated in FIG. 3A, the reference flag is set to "1" to indicate that more than one LBA points to the same physical address and set to "0" to indicate that more than one LBA does not point to the same physical address (e.g., only one LBA points to the physical address). However, different conventions for the reference flag may be used. For example, other conventions may set the flag to "0" to indicate that more than one LBA points to the same physical address. In another example, more than one bit is used to indicate that more than one LBA points to the same physical address. For example, the reference flag may include a count of how many LBAs point to the same physical address.

FIG. 3B illustrates an example of a subset physical-to-logical (P2L) table for an NVM device capable of performing on-SSD copy-on-write operations. The subset P2L table 153 maps a given physical NAND address to all the L2P entries that refer to that physical address. Instead of mapping all the NAND addresses, it only maps the ones that are referred to by more than one L2P entry (e.g., more than one LBA). In one example, the subset P2L table is implemented using a hash-table with chaining. Any set of standard insert, lookup, and/or delete algorithms may be used to update the P2L table 153. In one example, the subset P2L table 153 can be stored in the DRAM as an extended area of the L2P table 151 and dropped to the NAND media periodically for backup or replay purposes.

Thus, in the illustrated example, the P2L table 153 stores only the physical addresses that are pointed to by more than one logical address, and therefore would typically store a subset of all physical addresses. In the example illustrated in FIG. 3B, the physical address X has two entries in the P2L table 153 because two logical addresses (A and B) refer to the physical address X. The physical address Y is not in the subset P2L table 153 because only one logical address (C) refers to the physical address Y.

Figure 3C:
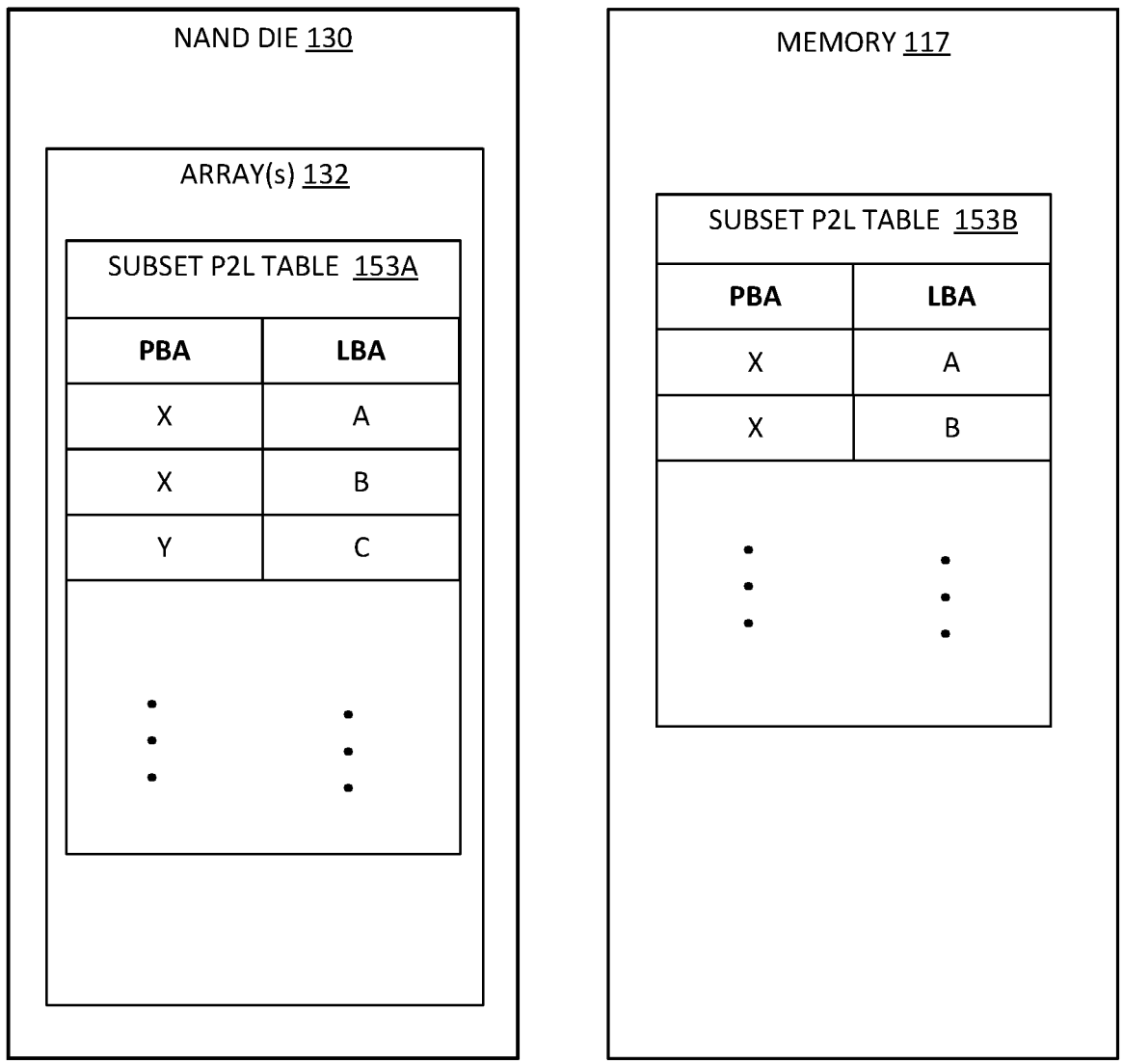
FIG. 3C is a block diagram of an example of storing at least a portion of the P2L table on the NAND media and at least a portion of the P2L table in DRAM.

The subset P2L table is shown previously as being stored in DRAM and backed-up on the NAND media (see, e.g., FIG. 2). However, in another example, at least a portion of the subset P2L table is stored on the NAND media and at least a portion of the P2L table is stored in DRAM. For example, consider a case in which the host issues many copy commands. If the number of copy commands received is sufficiently large, the subset P2L table size can expand to be as big or even bigger than the L2P table size. In one example, the subset P2L table size may be bounded by write-back caching it in SSD-internal DRAM, with the NAND media as the backing media, and using PLI energy for saving dirty entries upon power-failure. FIG. 3C is a block diagram of an example of storing at least a portion of the P2L table on the NAND media and at least a portion of the P2L table in DRAM. As can be seen in FIG. 3C, a portion of all of the subset P2L table 153A is stored in the NAND array 132, and a portion of the subset P2L table is stored on the memory 117. In one example, the entire subset P2L table 153A is stored on the NAND media and it is cached on the DRAM. In one such example, the portion of the subset P2L table 153B stored in memory 117 stores the most recently and/or frequently accessed entries on the subset P2L table 153A. In another example, a tiered approach to the subset P2L table is implemented in which a portion of the subset P2L table 153B is stored in memory 117 and the remaining portion of the subset P2L table 153A is stored in the NAND media.

Thus, the subset P2L table may be stored only on DRAM and backed up to the NAND media (as shown in FIG. 2) or may be stored on both the DRAM and the NAND media (as shown in FIG. 3C. In one example in which the subset P2L table is stored across both the DRAM and NAND media, a tiered approach is used in which the entries of the subset P2L table are split between the DRAM and NAND media. In another example in which the subset P2L table is stored across both the DRAM and the NAND media, a caching approach is used in which the entire subset P2L table is stored on the NAND media and a subset of those entries is stored (or cached) on the DRAM.

Figure 4:
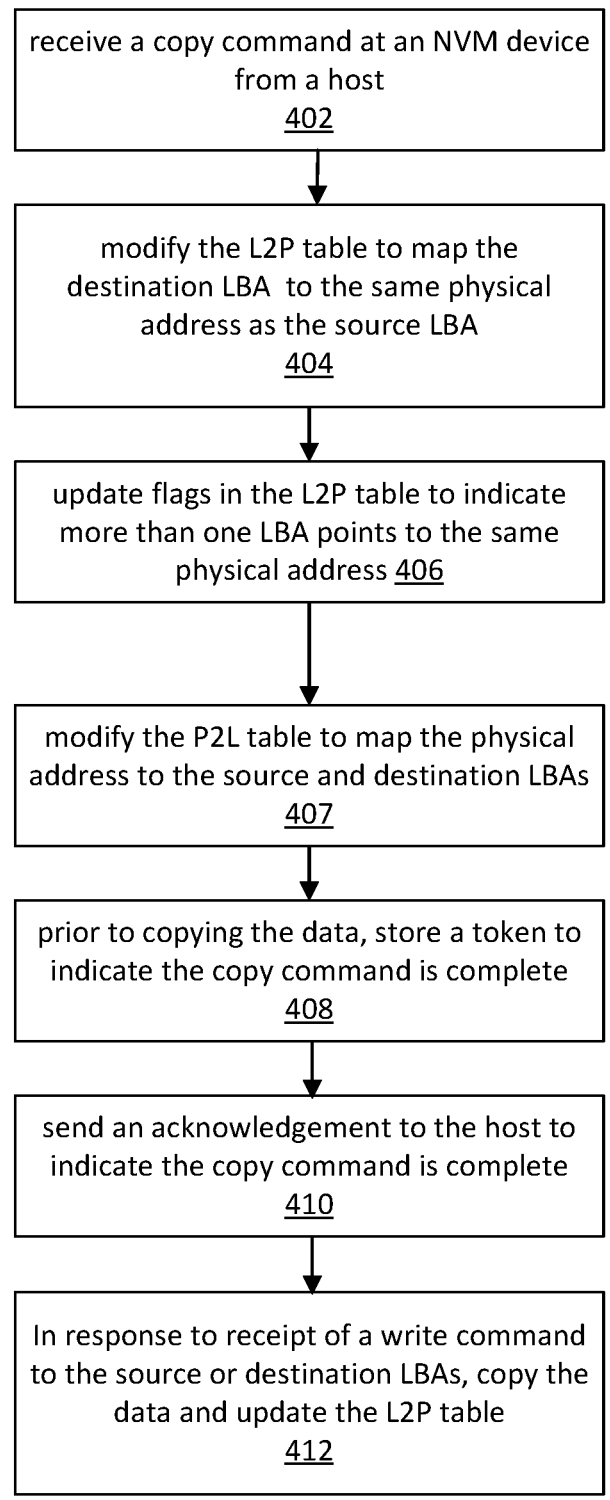
FIG. 4 is a flow diagram of a method of performing an on-SSD copy-on-write operation.

FIG. 4 is a flow diagram of a method of performing an on-SSD copy-on-write operation. The method 400 may be performed by hardware (e.g., circuitry) such as a controller in an NVM device, firmware, or a combination of hardware and firmware. In one example, the method 400 is performed by an ASIC controller on an NVM device that is executing firmware stored in memory on the NVM device. For example, referring to FIG. 2, the NAND controller 104 can execute instructions in the firmware 115 to perform the method 400.

The method 400 of FIG. 4 begins with receiving a copy command at an non-volatile storage device from a host, at 402. For example, referring to FIG. 1, the NVM device 120 receives a copy command from the host 150 to copy data from a source logical block address (LBA) to a destination logical block address (LBA). The command is sent over an interface (e.g., via interfaces 156 and 121). Thus, the host includes input/output (I/O) circuitry to transmit the copy command to the NVM device, and the NVM device 120 includes input/output (I/O) circuitry to receive the command from the host according to one or more protocols. In addition to the source address and the destination address, the command can include or specify the number of blocks (or other granularity of memory units) to copy.

After receiving the copy command, the controller on the NVM device modifies a logical-to-physical (L2P) table to map the destination LBA to a same physical address as the source LBA, at 404. For example, referring to FIG. 3A, considering a scenario in which the copy command indicated the data at LBA A should be copied to LBA C, the physical address pointed to by the LBA C would be updated to point to the same physical address (X) as the LBA A. In one such example, prior to modifying the L2P table to point the destination LBA to the same physical address as the source LBA, an entry (if present) of the P2L table associating a different physical address with the destination LBA may be removed. Also prior to modifying the L2P table to map the destination address to the same physical address as the source address, the entry for the destination address in the L2P table may be "zeroed out" or cleared. For example, referring to FIG. 3A, considering the scenario in which the data at LBA A is to be copied to LBA C, the physical address and reference flag corresponding to LBA C would first be cleared (e.g., set to zero).

Referring again to the method 400 of FIG. 4, flags of the L2P table corresponding to the source LBA and the destination LBA are updated to indicate more than one LBA refers to the same physical address, at 406. For example, referring to FIG. 3A, considering the scenario where the data stored at the LBA A is to be copied to the LBA C, the reference flags corresponding to both LBA A and LBA C are set to '1' to indicate that more than one LBA points to the physical address X. In this example, the flag for LBA A is already set to "1", so there is no actual change to the flag associated with LBA A. However, the flag for LBA C was previously set to '0', to indicate that more than one LBA does not refer to the physical address Y, therefore, the flag associated with LBA C is changed from '0' to '1'.

Referring again to FIG. 4, a physical-to-logical (P2L) table is also updated to associate the physical address with both the destination LBA and the source LBA, at 407. In one example, the P2L table is a subset P2L table that maps a subset of physical addresses that are referred to by more than one LBA. For example, referring to FIG. 3B, considering the scenario where the data at LBA A is copied to LBA C, an entry associating the physical address X with the LBA C would be added to the subset P2L table 153.

After modifying the L2P table and before copying the data, a token is stored to the non-volatile storage device to indicate the copy command is complete, at 408. The token may be a data structure including information about the on-SSD-copy command. In one example, the token includes a unique signature, such as a unique number to indicate the token is a copy command token. In addition to a signature, the token may include the source LBA for the copy operation, the destination LBA for the copy operation, and a number of blocks to copy. The token may also include a checksum to indicate whether the token is corrupt or valid. In one example, the token is stored in the non-volatile media and consumes an entire page or block. For example, referring to FIG. 2, an on-SSD-copy command token 159 is stored in the array 132. Even though the token may include data having a size that is smaller than the granularity of data (e.g., block or page) in the NVM device, the token may consume the entire block or page of data. For example, consider an NVM device in which the granularity of data is in 4 kB NAND pages. In one such example, the token may use up or consume the entire 4 kB NAND page, although only a small portion (e.g., several bytes or tens of bytes) of the NAND page stores the token.

The token may be used to enable the NVM device to rebuild or replay the L2P table and the subset P2L table in the event of a surprise power loss. In one example, during replay, the controller scans all the NAND pages, starting with the first page, to see what data is in the page. Each NAND page may include header information about what is stored in the NAND page. For example, a NAND page header may indicate an LBA, which the controller reads and uses to rebuild the L2P table. During replay, if the controller encounters an on-SSD-copy token, it indicates to the controller that the host sent a copy command and the details of the copy command (e.g., the source and destination LBAs and the number of blocks to be copied).

Thus, the tokens can enable the controller to rebuild the L2P table or the P2L table. Because the L2P table and the subset P2L table checkpoints may be dropped (e.g., stored) to the NAND media periodically, in case of surprise power loss, the latest checkpoint of the L2P and subset P2L tables are be loaded in the subsequent power on. The controller can then rebuild using the latest L2P and subset P2L table backups and using the tokens by replaying all the NAND pages after the checkpoint. The token may be stored at the time the copy operation is performed (but before actual data copy), or at a later time. For example, storage of the token may be delayed until a number of tokens to store is greater than a predetermined number. For example, the tokens to write to the NAND media may be accumulated, so as not to incur a NAND-write penalty per copy operation. Accumulating tokens prior to writing the tokens maybe beneficial for small copies (e.g., single indirection-unit granularity length copies), because if the token for each small copy is stored at the time of the copy operation, the number of writes to the media may not reduced and may even slightly increase due to writing a token per copy and keeping the subset P2L updated.

Turning again to FIG. 4, the method 400 also includes sending an acknowledgement to the host to indicate the copy command is complete, at 410. The acknowledgement is sent after the L2P table is updated, but before the actual data copy is performed. Instead, the data is copied in response to receipt of a write command to write to the source LBA or the destination LBA, at 412. In one example, copying the data involves allocating a new page, copying the data to the new page, and updating the flags of the L2P table to indicate that only one LBA refers to the same physical address.

FIGS. 5-8 are examples of pseudocode to perform functions for an on-SSD-copy command on a NAND SSD. The examples in FIGS. 5-8 show functions with particular parameters, however, fewer, additional, or different parameters are possible. FIG. 5 is an example of pseudocode 500 for an L2P table entry. Lines 502-510 define a data structure for an entry (L2P_Entry) in an L2P table. The L2P entry includes a NAND_Address and a one-bit Reference_Flag. Referring to FIG. 3A, the NAND_Address is an example of the physical block address PBA, and the Reference_Flag is an example of the Reference Flag of the L2P 151. Referring again to FIG. 5, at line 512, a table (L2P) is instantiated with NUM_OF_ENTRIES entries. In an example where LBA A and B point to the same NAND address X, then:

L2P[A].NAND_Address=x;
L2P[A].Reference_Flag=1;
L2P[B].NAND_Address=x;
L2P[B].Reference_Flag=1;

Thus, the L2P table maps LBAs to NAND addresses. In addition to the NAND address, there is one bit per entry, Reference_Flag, which indicates if the NAND address is referred by multiple L2P entries.

FIG. 6 is an example of pseudocode 600 for an on-SSD-copy command. In the example illustrated in FIG. 6, on line 602, the copy command has three parameters: start source LBA (src), start destination LBA (dest), and the number of LBAs (num). The copy command performs a trim command of the destination LBA, at line 606. In one example, the trim command is like a delete command without removing the data from the physical media. Instead, the mapping information is removed (e.g., by zeroing out or clearing the mapping information in the L2P table). An example of pseudocode for a trim command is explained below in more detail with respect to FIG. 7.

Referring again to FIG. 6, at lines 608-618, the mapping information is updated for the destination LBA and the reference flags for both the source and destination LBAs are updated in the L2P table. At line 612, the NAND_Address for the destination LBA is set to the NAND_Address for the source LBA. At line 614, the Reference_Flag for the entry in the L2P table associated with the destination LBA is set to 1. At line 616, the Reference_Flag for the entry in the L2P table associated with the source LBA is set to 1. The reference flags indicate that the NAND_Address pointed to by the source and destination LBAs is referred to by more than one LBA.

At lines 620 and 622, the subset P2L table is updated. For example, an entry is added (inserted) in the subset P2L table to map the physical address to both the source and destination LBAs. At line 624, the token is dropped (e.g., stored to the NAND media) to indicate the copy operation is complete. In one example, the token is dropped to the NAND media to support PLI (power loss imminent)/replay. At line 624, ackHostCompletion is a call back function to acknowledge the command completion to the host.

Thus, once the SSD receives the copy command, the controller updates the L2P table without copying the data. The controller also updates the P2L table to track the latest P2L mapping information. Then, the controller drops a token to the NAND media so that the SSD can rebuild the latest L2P and P2L table in case of power failures. Once the token is dropped, the SSD acknowledges the command completion to the host.

FIG. 7 illustrates an example of pseudocode for on-SSD copy on write command, however, in one example, whether to perform a normal copy versus an on-SSD copy-on-write command depends on the size of the copy. For example, small data copy (single IU (indirection unit), or sub-IU) requests may be performed as read plus write operations, and larger data copies (e.g., data copies with more than one or more than a predetermined number of IUs) are performed as on-SSD copy-on-writes. In one such example, referring the pseudocode 600 of FIG. 6, the number of LBAs (num) to be copied is checked and if the number of LBAs is greater than a predetermined number, the on-SSD copy-on-write operation is performed (e.g., lines 606-624). If the number of LBAs to be copied is less than or equal to the predetermined number, a read and write operation is performed instead of an on-SSD copy-on-write.

FIG. 7 is an example of pseudocode 700 for a trim command. In the example illustrated in FIG. 7, the trim command has two parameters: the start source LBA (src) and the number of LBAs to be trimmed (num), as shown on line 702.

In one example, if an L2P entry was part of a previous on-SSD-copy command, which can be identified by the reference flag (e.g., if reference flag indicates more than one LBA points to the physical address), the subset P2L table removes the L2P entry of the corresponding physical address. For example, referring to FIG. 7 lines 706-716, entries are removed from the P2L table if the reference flag is equal to 1. In one such example, for each subset P2L remove operation, if a physical address has only one or zero L2P entries that refer to it, the physical address will be removed from the subset P2L table. In addition to the subset P2L update (if needed), the L2P entries will be emptied and the reference flag of the affected L2P entry (if any) will be cleared. For example, in lines 718 and 720, the physical address is cleared from the L2P entry and the reference flag is cleared. In the example in FIG. 7, after updating the P2L and L2P tables, a token is dropped to the NAND media before a command completion is sent to the host, at line 724. A trim command token may be a data structure including information about the on-SSD-copy command. In one example, the token includes a unique signature, such as a unique number to indicate the token is a trim command token. The trim command token can support PLI and replay. For example, the acknowledgement to the host may be sent while the controller is updating the L2P table. If power is loss before the L2P table update is complete, the L2P table can be correctly rebuilt using the trim tokens.

FIG. 8 is an example of pseudocode 800 for a write command. In the example illustrated in FIG. 8, the write command has two parameters: the start source LBA (src) and the number of LBAs to be trimmed (num), as shown on line 802. Similar to the trim command, if an L2P entry was part of a previous on-SSD-copy command (e.g., if the reference flag indicates that more than one LBA points to the same physical address), the P2L table is updated. For example, the entry associating the LBA with the physical address can be removed because more than one LBA is no longer referring to the physical address (e.g., only one LBA is referring to the physical address). Referring to FIG. 8, lines 806-814, for each LBA, the reference flag of the entry in the L2P table for the source LBA is cleared to indicate more than one LBA does not refer to the physical address. On line 816, the entry associating the source LBA with the physical address is removed from the subset P2L. Lines 820-824 of the pseudocode handles NAND page allocation and DMA (direct memory access) transfer, so that the host data can be written to the NAND media. For example, at line 820, a new page is allocated for the source LBA. At line 824, a DMA transfer is setup to write the data to the newly allocated page.

Figure 9:
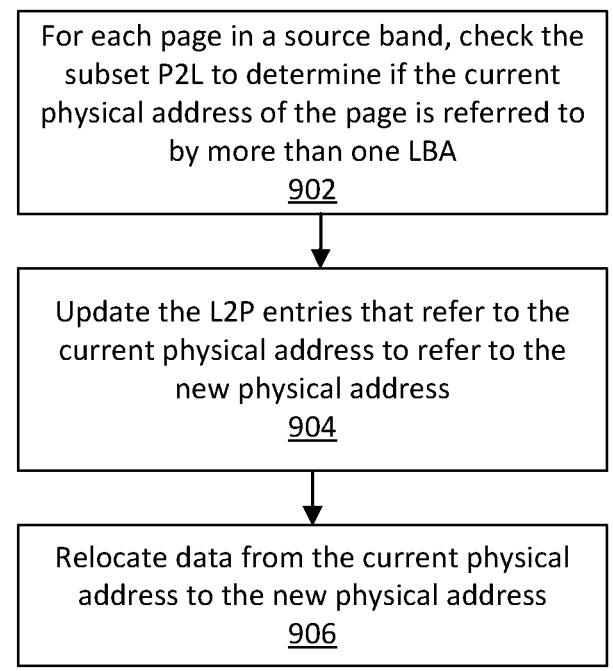
FIG. 9 is a flow diagram of an example of a defragmentation (defrag) method.

FIG. 9 is a flow diagram of an example of a defragmentation (defrag) method 900. During defrag, the valid pages of the selected band (e.g., the source band) are relocated to a new band (e.g., the destination band). In one example, the NAND pages are organized in bands, where each band includes multiple blocks and each block includes multiple pages. In one such example, each band includes a band journal that includes information regarding physical page to LBA mapping information for the pages in that band. Thus, the band journal may be, or include, a local P2L table, which is independent from the subset P2L described herein. In one example, the band journal is a NAND SSD data structure that logs the L2P entry when each NAND page is written to. The band journal may be used to rebuild the L2P table in the event of power loss. The band journal may also be used in performing defrag operations. For example, to perform a defrag operation, the source band journal is loaded into the memory.

Referring to FIG. 9, after loading the band journal, for each page in a source band, the controller checks the subset P2L to determine if the current physical address of the page is referred to by more than one LBA, at 902. The L2P entries that refer to the current physical address are updated to refer to the new physical address, at 904. If more than one LBA refers to the same physical address, multiple entries in the L2P table are updated to point to the new physical address. The data is then relocated from the current physical address to the new physical address, at 906.

Thus, performing a defrag operation to move valid pages of a source band to a destination band involves, for each physical address in the source band that has an entry in the P2L table, updating all entries in the L2P table corresponding to the physical address to a new physical address in the destination band. In one example, each NAND page address of the source band is searched in the subset P2L table. If the NAND page address is found, the page is valid and referred by more than one L2P entries. Therefore, the page is to be relocated, and the corresponding L2P and P2L entries are updated. If the NAND page address is not found in the subset P2L table, the SSD checks its L2P entry stored in the band journal. If the L2P entry stored in the band journal still points to this NAND address, the page is valid and is to be relocated.

FIG. 10 is an example of pseudocode 1000 for a defrag operation. In the example illustrated in FIG. 10, the defrag command has two parameters: a source band index (source) and a destination band index (dest), as shown in line 1002. The band journal for the source band is loaded, at line 1006. For each page in the band (line 1008), the current NAND address (currNandAddress) is set to be the current address of the source band (line 1012) and a new NAND page address (newNandAddress) is set to be an available page in the destination band (line 1014). The subset P2L table is checked for each current NAND address, at line 1016. If the current NAND address is in the subset P2L table, in indicates the NAND page has more than one reference. All L2P entries that point to the current NAND address are updated to point to the new NAND address, at line 1020. The data can then be relocated from the current NAND page to the new NAND page, at line 1022.

If the current NAND page is not in the subset P2L (line 1026), it indicates that more than one LBA does not point to the current NAND page. If the entry in the L2P table is valid (lines 1030 and 1032), the L2P table entry is updated to point to the new NAND page address (line 1036) and the data can be relocated from the current NAND page to the new NAND page, at line 1038.

Thus, an on-SSD copy-on-write operation can improve system performance. In one example, when the host issues a copy command, the SSD updates the L2P entries without moving the data. The data movement is deferred until either of the copies is modified by the host. To support PLI and replay, a token is dropped to the NAND media for each copy command before the SSD sends command completion to the host. To support defrag, a subset P2L table is maintained in the DRAM and dropped to the NAND media periodically with the L2P table.

FIG. 11 provides an exemplary depiction of a computing system 1100 (e.g., a smartphone, a tablet computer, a laptop computer, a desktop computer, a server computer, etc.). As observed in FIG. 11, the system 1100 may include one or more processors or processing units 1101. The processor(s) 1101 may include one or more central processing units (CPUs), each of which may include, e.g., a plurality of general-purpose processing cores. The processor(s) 1101 may also or alternatively include one or more graphics processing units (GPUs) or other processing units. The processor(s) 1101 may include memory management logic (e.g., a memory controller) and I/O control logic. The processor(s) 1101 can be similar to, or the same as, the processor 152 of FIG. 1.

The system 1100 also includes memory 1102 (e.g., system memory), non-volatile storage 1104, communications interfaces 1106, and other components 1108, which may also be similar to, or the same as, components of the host 150 of FIG. 1. The other components may include, for example, a display (e.g., touchscreen, flat-panel), a power supply (e.g., a battery or/or other power supply), sensors, power management logic, or other components. The communications interfaces 1106 may include logic and/or features to support a communication interface. For these examples, communications interface 1106 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more standards promulgated by IEEE. For example, one such Ethernet standard may include IEEE 802.3. Network communication may also occur according to one or more OpenFlow specifications such as the OpenFlow Switch Specification. Other examples of communications interfaces includes, for example, a local wired point-to-point link (e.g., USB) interface, a wireless local area network (e.g., WiFi) interface, a wireless point-to-point link (e.g., Bluetooth) interface, a Global Positioning System interface, and/or other interfaces.

The computing system also includes non-volatile storage 1104, which may be the mass storage component of the system. The non-volatile storage 1104 can be similar to, or the same as, the NVM device 120 of FIG. 1, described above. The non-volatile storage 1104 can include a solid state drive (SSD), a dual in-line memory module (DIMM), or other non-volatile storage. Non-volatile types of memory may include non-volatile memory such as, but not limited to, multi-threshold level NAND flash memory (e.g., 3D NAND flash memory. In one example, the non-volatile storage 1104 may include mass storage that is composed of one or more SSDs. SSDs can be composed of flash memory chips that are capable of implementing the copy techniques described above.

Examples of on-SSD copy-on-write follow.

Example 1: A method including: receiving, at a non-volatile storage device, a copy command from a host to copy data from a source logical block address (LBA) to a destination logical block address (LBA); modifying a logical-to-physical (L2P) table to map the destination LBA to a same physical address as the source LBA; updating flags in the L2P table corresponding to the source LBA and the destination LBA to indicate more than one LBA refers to the same physical address; after modifying the L2P table and setting the flags and before copying the data, storing a token to the non-volatile storage device to indicate the copy command is complete; and sending an acknowledgement to the host to indicate the copy command is complete.

Example 2: The method of example 1, wherein the token includes a signature, the signature including a number to indicate the token is a copy command token.

Example 3: The method of any of examples 1 or 2, wherein the token includes: the source LBA, the destination LBA, and a number of blocks to copy.

Example 4: The method of any of examples 1-3, wherein the token includes: a checksum to indicate whether the token is corrupt.

Example 5: The method of any of examples 1-4, further including updating a physical-to-logical (P2L) table to associate the physical address with both the destination LBA and the source LBA.

Example 6: The method of any of examples 1-5, wherein the P2L table maps a subset of physical addresses that are referred to by more than one LBA.

Example 7: The method of any of examples 1-6, further including prior to modifying the L2P table to point the destination LBA to the same physical address as the source LBA, removing an entry of the P2L table associating a second physical address with the destination LBA.

Example 8: The method of any of examples 1-7, further including in response to receipt of a write command to write to the source LBA or the destination LBA: allocating a new page, copying the data to the new page, and updating the flags to indicate only one LBA refers to the same physical address.

Example 9: The method of any of examples 1-8, further including: performing a defragmentation (defrag) operation to move valid pages of a source band to a destination band, the defrag operation including: for each physical address in the source band that has an entry in a P2L table, updating all entries in the L2P table corresponding to the physical address to a new physical address in the destination band.

Example 10: The method of any of examples 1-9, wherein: storing the token is delayed until a number of tokens to store is greater than a predetermined number.

Example 11: An article of manufacture including a computer readable storage medium having content stored thereon which when accessed causes the performance of operations to execute a method in accordance with any of examples 1-10.

Example 12: A NAND controller to execute firmware to perform a method in accordance with any of examples 1-10.

Example 13: A storage device including a NAND memory array, and control logic coupled with the NAND memory array, the control logic to: receive a copy command from a host to copy data from a source logical block address (LBA) to a destination logical block address (LBA); update an entry in a logical-to-physical (L2P) table corresponding to the destination LBA to refer to a same physical address as a second entry in the L2P table corresponding to the source LBA; update a flag of the entry corresponding to the destination LBA and the entry corresponding to the source LBA to indicate more than one LBA refers to the same physical address; after update of the entry and the second entry in the L2P table and before the data is copied, store a token to the NAND memory array to indicate the copy command is complete; and send an acknowledgement to the host to indicate the copy command is complete.

Example 14: The storage device of example 13, wherein the control logic is to perform a method in accordance with any of examples 1-10.

Example 15: A system including: a processor, and a NAND storage device coupled with the processor, the NAND storage device including: NAND memory array, and control logic coupled with the NAND memory array, the control logic to: receive a copy command from a host to copy data from a source logical block address (LBA) to a destination logical block address (LBA); update an entry in a logical-to-physical (L2P) table corresponding to the destination LBA to refer to a same physical address as a second entry in the L2P table corresponding to the source LBA; update a flag of the entry corresponding to the destination LBA and the entry corresponding to the source LBA to indicate more than one LBA refers to the same physical address; after update of the entry and the second entry in the L2P table and before the data is copied, store a token to the NAND memory array to indicate the copy command is complete; and send an acknowledgement to the host to indicate the copy command is complete.

Example 16: The system of example 15, including one or more of: a display coupled with the processor, a network interface coupled with the processor, and a battery to power the system.

Example 17: The system of example 15 or 16, wherein the control logic is to perform a method in accordance with any of examples 1-10.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., FPGA, PLD) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Flow diagrams as illustrated herein provide examples of sequences of various process actions. The flow diagrams can indicate operations to be executed by a software or firmware routine, as well as physical operations. In one example, a flow diagram can illustrate the state of a finite state machine (FSM), which can be implemented in hardware, software, or a combination. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various examples; thus, not all actions are required in every embodiment. Other process flows are possible.

To the extent various operations or functions are described herein, they can be described or defined as software code, instructions, configuration, data, or a combination. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals, or both, to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An article of manufacture comprising a non-transitory computer readable storage medium having content stored thereon which when accessed causes the performance of operations to execute a method comprising:
   receiving, at a non-volatile storage device, a copy command from a host to copy data from a source logical block address (LBA) to a destination logical block address (LBA);
   modifying a logical-to-physical (L2P) table to map the destination LBA to a same physical address as the source LBA;
   updating flags in the L2P table corresponding to the source LBA and the destination LBA to indicate more than one LBA refers to the same physical address;
   after modifying the L2P table and setting the flags and before copying the data, storing a token to the non-volatile storage device to indicate the copy command is complete;
   sending an acknowledgement to the host to indicate the copy command is complete; and
   in response to receipt of a write command to write to the source LBA or the destination LBA and in response to at least one of the flags having been set, copying the data.

2. The article of manufacture of claim 1, wherein:
   the token includes a signature, the signature including a number to indicate the token is a copy command token.

3. The article of manufacture of claim 2, wherein:
   the token includes: the source LBA, the destination LBA, and a number of blocks to copy.

4. The article of manufacture of claim 2, wherein:
   the token includes: a checksum to indicate whether the token is corrupt.

5. The article of manufacture of claim 1, further comprising:
   updating a physical-to-logical (P2L) table to associate the physical address with both the destination LBA and the source LBA.

6. The article of manufacture of claim 5, wherein:
   the P2L table maps a subset of physical addresses that are referred to by more than one LBA.

7. The article of manufacture of claim 5, further comprising:
   prior to modifying the L2P table to point the destination LBA to the same physical address as the source LBA, removing an entry of the P2L table associating a second physical address with the destination LBA.

8. The article of manufacture of claim 1, wherein copying the data comprises:
   allocating a new page,
   copying the data to the new page, and
   updating the flags to indicate only one LBA refers to the same physical address.

9. The article of manufacture of claim 1, further comprising:
   performing a defragmentation (defrag) operation to move valid pages of a source band to a destination band, the defrag operation including:
   for each physical address in the source band that has an entry in a P2L table, updating all entries in the L2P table corresponding to the physical address to a new physical address in the destination band.

10. The article of manufacture of claim 1, wherein:
    storing the token is delayed until a number of tokens to store is greater than a predetermined number.

11. A storage device comprising:
    NAND memory array; and
    control logic coupled with the NAND memory array, the control logic configured to at least:
    receive a copy command from a host to copy data from a source logical block address (LBA) to a destination logical block address (LBA);
    update an entry in a logical-to-physical (L2P) table corresponding to the destination LBA to refer to a same physical address as a second entry in the L2P table corresponding to the source LBA;
    update a flag of the entry corresponding to the destination LBA and the entry corresponding to the source LBA to indicate more than one LBA refers to the same physical address;
    after update of the entry and the second entry in the L2P table and before the data is copied, store a token to the NAND memory array to indicate the copy command is complete;
    send an acknowledgement to the host to indicate the copy command is complete; and
    in response to receipt of a write command to write to the source LBA or the destination LBA and in response to at least one of the flags having been set, copying the data.

12. The storage device of claim 11, wherein:
    the token includes a signature, the signature including a number to indicate the token is a copy command token.

13. The storage device of claim 12, wherein:
    the token includes: the source LBA, the destination LBA, and a number of blocks to copy.

14. The storage device of claim 12, wherein:
    the token includes: a checksum to indicate whether the token is corrupt.

15. The storage device of claim 11, wherein:
    the control logic is also configured to:

update a physical-to-logical (P2L) table to associate the physical address with both the destination LBA and the source LBA.

16. The storage device of claim 15, wherein:
the P2L table maps a subset of physical addresses that are referred to by more than one LBA.

17. The storage device of claim 15, wherein:
the control logic is also configured to:
prior to modifying the L2P table to point the destination LBA to the same physical address as the source LBA, remove an entry of the P2L table associating a second physical address with the destination LBA.

18. The storage device of claim 11, wherein copying the data comprises:
allocating a new page,
copying the data to the new page, and
updating the flags to indicate only one LBA refers to the same physical address.

19. A system comprising:
a processor; and
a NAND storage device coupled with the processor, the NAND storage device including:
NAND memory array; and
control logic coupled with the NAND memory array, the control logic configured to at least:
receive a copy command from a host to copy data from a source logical block address (LBA) to a destination logical block address (LBA);
update an entry in a logical-to-physical (L2P) table corresponding to the destination LBA to refer to a same physical address as a second entry in the L2P table corresponding to the source LBA;
update a flag of the entry corresponding to the destination LBA and the entry corresponding to the source LBA to indicate more than one LBA refers to the same physical address;
after update of the entry and the second entry in the L2P table and before the data is copied, store a token to the NAND memory array to indicate the copy command is complete;
send an acknowledgement to the host to indicate the copy command is complete; and
in response to receipt of a write command to write to the source LBA or the destination LBA and in response to at least one of the flags having been set, copying the data.

20. The system of claim 19, comprising one or more of:
a display coupled with the processor, a network interface coupled with the processor, and a battery to power the system.

* * * * *